US009475089B2

(12) United States Patent
Zabinski

(10) Patent No.: US 9,475,089 B2
(45) Date of Patent: Oct. 25, 2016

(54) METHOD FOR DURABLY BONDING FUNCTIONAL LAYERS TO SURFACES

(71) Applicant: The United States of America, as represented by the Secretary of the Air Force, Washington, DC (US)

(72) Inventor: Jeffrey F. Zabinski, Yellow Springs, OH (US)

(73) Assignee: The United States of America, as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/164,722

(22) Filed: Jan. 27, 2014

(65) Prior Publication Data
US 2015/0367382 A1 Dec. 24, 2015

Related U.S. Application Data

(63) Continuation of application No. 12/741,282, filed as application No. PCT/US2009/038931 on Mar. 31, 2009, now Pat. No. 8,637,162.

(60) Provisional application No. 61/123,566, filed on Apr. 1, 2008.

(51) Int. Cl.
| | | |
|---|---|---|
| B05D 5/00 | (2006.01) | |
| B05D 5/08 | (2006.01) | |
| C23C 28/04 | (2006.01) | |
| B05D 1/24 | (2006.01) | |
| B05D 1/36 | (2006.01) | |
| B05D 5/12 | (2006.01) | |
| B05D 7/00 | (2006.01) | |
| B32B 9/00 | (2006.01) | |
| B32B 15/04 | (2006.01) | |
| B01J 35/02 | (2006.01) | |
| B01J 23/00 | (2006.01) | |
| B01J 27/057 | (2006.01) | |
| B01J 27/04 | (2006.01) | |
| B01J 20/00 | (2006.01) | |
| F16N 15/00 | (2006.01) | |
| B01J 8/08 | (2006.01) | |
| B01J 8/10 | (2006.01) | |
| B01J 8/38 | (2006.01) | |
| B32B 9/04 | (2006.01) | |
| B32B 15/00 | (2006.01) | |

(52) U.S. Cl.
CPC ............... *B05D 5/086* (2013.01); *B05D 1/24* (2013.01); *B05D 1/36* (2013.01); *B05D 5/00* (2013.01); *B05D 5/08* (2013.01); *B05D 5/083* (2013.01); *B05D 5/12* (2013.01); *B05D 7/52* (2013.01); *C23C 28/042* (2013.01); *C23C 28/044* (2013.01); *B01J 8/08* (2013.01); *B01J 8/10* (2013.01); *B01J 8/38* (2013.01); *B05D 2401/32* (2013.01); *B32B 9/00* (2013.01); *B32B 9/04* (2013.01); *B32B 9/041* (2013.01); *B32B 15/00* (2013.01); *B32B 15/04* (2013.01); *B32B 2250/02* (2013.01); *B32B 2250/20* (2013.01); *B32B 2264/10* (2013.01); *B32B 2264/102* (2013.01); *B32B 2264/104* (2013.01); *B32B 2264/105* (2013.01); *B32B 2264/107* (2013.01); *B32B 2264/108* (2013.01); *B32B 2264/12* (2013.01); *B32B 2307/30* (2013.01); *B32B 2307/40* (2013.01); *B32B 2307/714* (2013.01); *B32B 2307/746* (2013.01); *B32B 2307/752* (2013.01); *F16N 15/00* (2013.01); *Y10T 428/12493* (2015.01); *Y10T 428/30* (2015.01); *Y10T 428/31678* (2015.04)

(58) Field of Classification Search
None
See application file for complete search history.

(56) References Cited

U.S. PATENT DOCUMENTS

| | | | | |
|---|---|---|---|---|
| 2,990,294 | A * | 6/1961 | Long ........................ | 428/339 |
| 3,909,424 | A * | 9/1975 | Clark ..................... | C10M 7/00 |
| | | | | 508/121 |
| 4,099,200 | A | 7/1978 | Koutalides | |
| 4,435,839 | A * | 3/1984 | Gu ........................ | F16C 17/024 |
| | | | | 29/898.02 |

(Continued)

FOREIGN PATENT DOCUMENTS

| | | | |
|---|---|---|---|
| EP | 1 273 847 A1 * | 1/2003 | |
| EP | 1273847 | 1/2003 | |
| EP | 1301493 | 4/2003 | |
| GB | 2260338 | 4/1993 | |
| WO | WO 2009/124034 A1 * | 10/2009 | |

OTHER PUBLICATIONS

International Preliminary Report on Patentability for PCT/US2009/038931, Oct. 5, 2010, 5 pages.*

(Continued)

*Primary Examiner* — William Phillip Fletcher, III
(74) *Attorney, Agent, or Firm* — AFMCLO/JAZ; James Carey

(57) ABSTRACT

A new method for durably bonding layers of a functional material to surfaces physically and chemically bonds solid layer lubricants and other functional coatings to a substrate surface by first applying a bond layer of a selected substantially binder-free soft material onto the substrate surface by, for example, burnishing, and then applying the functional layer onto the bond layer. Example soft materials for the bond layer include soft oxides such as antimony trioxide and example solid layer lubricants include graphite, molybdenum disulfide and mixtures of such lubricants. The new method is a major improvement over conventional bonding or coating methods. The process is non-vacuum at ambient temperatures and requires no binders, adhesives, curing or baking. Lubricant performance is enhanced by orders of magnitude compared to conventional approaches. The method is inexpensive, environmentally friendly, applicable to almost any substrate material and scalable.

18 Claims, 3 Drawing Sheets

(56) References Cited

U.S. PATENT DOCUMENTS

| | | | |
|---|---|---|---|
| 5,407,590 A * | 4/1995 | Salvia | C10M 111/04 427/185 |
| H001924 H | 12/2000 | Zabinski et al. | |
| 6,548,453 B1 * | 4/2003 | Narasimhan | B05D 5/08 428/327 |
| 6,815,400 B2 | 11/2004 | Jee et al. | |
| 6,863,974 B2 * | 3/2005 | Shah et al. | 428/325 |
| 7,816,011 B2 | 10/2010 | Leu et al. | |
| 2002/0183209 A1 * | 12/2002 | Jee et al. | 508/113 |
| 2005/0153157 A1 | 7/2005 | Matsubayashi et al. | |
| 2006/0008668 A1 | 1/2006 | Thomae | |
| 2006/0177685 A1 | 8/2006 | Matsuda et al. | |
| 2007/0012356 A1 | 1/2007 | Nanu et al. | |
| 2008/0159671 A1 | 7/2008 | Leonardelli | |
| 2008/0213467 A1 | 9/2008 | Yu et al. | |
| 2009/0181236 A1 | 7/2009 | Anderson et al. | |

OTHER PUBLICATIONS

Hu et al., "Microstructure and lubrication mechanism of multilayered MoS2/Sb2O3 thin films," Tribology Letters, vol. 21, No. 2, Feb. 2006, pp. 169-174.*

Zabinski et al., "Multi-environmental lubrication performance and lubrication mechanism of MoS2/Sb2O3/C composite films," Tribology Letters, vol. 23, No. 2, Aug. 2006, pp. 155-163.*

Supplemental European Search Report and Written Opinion in corresponding EP application—EP 2282894; dated Sep. 20, 2011, 6 pages.

International Search Report and Preliminary Report on Patentability for corresponding PCT Application (WO2009/124023), dated Oct. 5, 2010, 6 pages.

First Office Action issued in Corresponding EP application—EP 2282894; dated Feb. 17, 2014, 5 pages.

J. S. Zabinski, M. S. Donley, S. D. Walck, T. R. Schneider, and N. T. McDevitt, "The Effects of Dopants on the chemistry and Tribology of Sputtered-Deposited MoS2 Films," Tribology Transac., 38 (1995) 894-904, 11 pages.

Second Office Action issued in Corresponding EP application—EP 2282894; dated Nov. 27, 2015, 6 pages.

Hu, JJ; Bultman, JE; and Zabinski, JS, "Microstructure and lubrication mechanism of multilayered MoS2/Sb2O3 thin films," Tribology Letters, vol. 21, No. 2, Feb. 2006, 6 pages.

Zabinski, JS; Bultman, JE; Sanders, JH, and Hu, JJ, "Multi-environmental lubrication performance and lubrication mechanism of MoS2/Sb2O3/C composite films," Tribology Letters, vol. 21, No. 2, Feb. 2006, 9 pages.

Zabinski, JS; Donley, MS; and McDevitt, NT, "Mechanistic study of the synergism between Sb2O3 and MoS, lubricant systems- using Raman- spectroscopy," Wear, 165 (1993) 103-108, 6 pages.

* cited by examiner

METHOD FOR DURABLY BONDING FUNCTIONAL LAYERS TO SURFACES

CROSS-REFERENCE TO RELATED APPLICATIONS

This application is a continuation application from application Ser. No. 12/741,282, filed May 4, 2010, now U.S. Pat. No. 8,637,162, issued Jan. 28, 2014, which was a 35 U.S.C. §371 National Stage Application from International Application No. PCT/US2009/038931, filed Mar. 31, 2009, which in turn claimed the benefit of the filing date of Provisional Application No. 61/123,566, filed Apr. 1, 2008. This application claims the benefit of the filing dates of all three prior applications and incorporates their contents by reference into this application.

STATEMENT OF GOVERNMENT INTEREST

The invention described herein can be manufactured and used by or for the U.S. Government for governmental purposes without the payment of any royalty.

BACKGROUND OF THE INVENTION

This invention relates generally to methods for durably binding a functional layer to a substrate surface, and more specifically to methods for durably binding a solid film lubrication layer to a substrate surface.

Friction is the resistance of one solid sliding over another solid. Often, the higher the friction the greater the wear. The best way to reduce friction and wear is by separating the surfaces. This can be accomplished by use of a liquid lubricant such as oil. The ideal condition is known as hydrodynamic lubrication and can eliminate wear by fully separating materials by a fluid film. Unfortunately, ideal conditions of hydrodynamic lubrication are rarely maintained in practice. Starting, stopping, misalignment, heavy loads and other conditions can cause a fluid film to be squeezed out, or allow surface asperities to break through the lubricant film, so that the two solids are pressed into contact with one another, ending that ideal hydrodynamic lubrication and beginning elastohydrodynamic or boundary lubrication. If no liquid is present, the surface is either self-lubricated (no lubrication) or a solid lubricant can be used. Solid film lubrication is a critical enabling technology employed in the absence of liquid lubricants. The choice to forgo a liquid lubricant or grease can be from either design constraints or too severe operating conditions for liquid and grease survival. Extreme operating conditions are typically defined by severe environments, such as from water, chemicals, temperatures and pressures. Extreme operating conditions require a distinct and separate class of lubricants. The harsh environment of outer space and internal combustion engines, for example, is marked by such extreme conditions and has spurred development of a special class of non-organic based lubricants. Solid film lubricants have been very successful in fulfilling the role of providing wear protection in such conditions. Relative to liquid lubricants, solid lubricants generally have lower vapor pressures, better boundary lubrication properties and relative insensitivity to radiation effects and operate in wider temperature ranges.

Solid Film Lubricants

Successful solid film lubricants are characterized by the following properties:
- low shear strength
- high adhesion
- low abrasivity
- thermo-dynamic stability.

For moving mechanical components, these properties are essential to reduce metal on metal contact and thereby reduce friction, heat and wear. Much work has been done identifying materials which have these properties. Generally, but not exclusively, there are 3 distinct classes of soft solid film lubricants meeting these criteria:
- Graphite (diamond like carbon (DLC), although carbon based, is not a soft solid film)
- Dichalcogenides of molybdenum and tungsten
- Soft Metals

Graphite

Graphite is the stable form of carbon. The bulk lubricating properties of graphite were been known as early as 1906 and the dichalcogenides as early as 1939. Graphite is used extensively in the electrical industry for its good lubrication properties as well as its good electrical conductivity. Graphite is a durable, heavy-duty lubricant that can endure extreme temperature fluctuations ranging from −100° C. to 350° C. Graphite has a sheet like structure where the atoms all lie in a plane and are only weakly bonded to the graphite sheets above and below. The C—C bond is strong in 2 dimensions but weak in the third with a hexagonal crystal orientation. Much like a deck of playing cards, the sheets slide easily. Graphite provides the best wear protection in the presence of moisture.

Dichalcogenides of Molybdenum and Tungsten

The dichalcogenides of molybdenum and tungsten meet the successful solid film lubricant criteria very well and have been used extensively and successfully on most space missions, and other environments of vacuum and temperature extremes, since the late 1960's. $MoS_2$ is a naturally occurring mineral, formed and mined with other ores in various parts of the world. It is highly refined and processed into 0.5 micron average particle sizes suitable for use as a solid lubricant. It possesses the propertie of being able to withstand extremely high load capacities up to 600 ksi. It is chemically stable, has a very low coefficient of friction in powder form, 0.05 to 0.09, and has thermo-stability from cryogenic temperatures to 350° C. $MoS_2$ is an ideal solid film lubricant material for extreme environments.

On an atomic level, the dichalcogenide lubricants have a hexagonal crystal structure with strong cation bonded layers creating a basal plane sandwiched between two weekly bonded anions (Van der Waals forces). The net effect is similar to a deck of cards sliding parallel to the long axis, the sliding axis, producing very low friction between mating surfaces. As a rule of thumb, $MoS_2$ is the preferred lubricant for vacuum/cryogenics and graphite the preferred lubricant for use in air, graphite relying on moisture to induce the proper shear.

Two major milestones in thin solid film lubricant technology are when T. Spalvins in 1967 at NASA Lewis first reported on the properties of sputter vacuum deposited $MoS_2$ films, and when B. C. Stupp in 1968 began to commercially provide physical vapor deposition (PVD) applied $MoS_2$ coatings in Dayton, Ohio. PVD processing resulted in the then highest adhesion solid film lubricant coatings.

Soft Metals

In addition to the dichalcogenide and graphite lamellar type films, soft metals such as Au, Ag, In, Cr, Pb can provide wear protection under extreme conditions and meet the requirements of successful solid film lubrication. Soft metallic lubricants have crystal structures with multiple slip planes and do not work-harden appreciably during sliding contacts. Dislocations and point defects generated during shear deformation are rapidly nullified by the frictional heat produced during sliding contact. Reported friction coefficients of soft metals range from 0.1 to 0.4, depending on the metal and test conditions. Ion-plated lead films are extensively used in Europe. In solar array drives alone, more than 2 million operational hours in orbit have been accumulated. An important property of the lead film is its high load-carrying ability. Under Hertzian contact, the as-deposited film flows plastically until a thin film (10 nm thickness or less) remains and then elastically deforms the substrate. In this condition, the film can survive contact loads approaching the static load capacity of a rolling element bearing. Lead coatings have had good success as a solid lubricant in vacuum applications and additionally are used extensively as a solid film lubricant for the high speed bearing in imaging X-ray tubes under vacuum. Optimum performance of lead and other metals is achieved at an approximately 1 um thickness. Silver and indium have been investigated, but actual usage in space is not reported. Solid lubricant films are used in a variety of mechanisms on various spacecraft and launch vehicles. Deposition of soft metals (Pb, Au, Ag, In) by ion plating provides excellent adhesion. These films have been particularly effective in spacecraft bearings found in solar array drive mechanisms in European satellites, on the Hubble space telescope and the BAXS gear for the International Space Station solar collector gear drive. Gold and silver are used in situations requiring electrical conductivity. Sputter-deposited $MoS_2$ has a lower coefficient of friction than ion-plated Pb 0.01 versus 0.1, which means that $MoS_2$ components should develop less torque.

There are other lubricant materials that have been reported, but they only find application in limited conditions. For example, $CaF_2$, $BaF_2$ and cesium oxythiomolybdates/tungstates have been used for high temperature lubrication. They become soft and their shear strength decreases as the temperature increases.

Solid Film Lubricant Deposition

Today there are many industrialized methods of solid film lubricant deposition for extreme environments. The general categories in order of increasing cost, complexity and adhesion are as follows:
Burnished Powders
Painting with Volatile Organic Compounds (VOCs) and Binders
Physical Vapor Deposition (PVD) Vacuum Deposited Burnished Powers Solid film lubricants or other functional materials are mixed and placed on a carrier material such as a cloth, blasting media, inert media or specially designed fixtures. The parts to be coated are then brought in contact with the various media resulting in a film of the solid lubricant on the surface of the part. The lubricant material marginally adheres to the surface of the part with a mechanical bond at best.

Painting

Solid film lubricants or other functional materials are mixed with organic solvents as well as binders and parts are coated by paint spray guns, dipping or spin coating. Parts must be grit blasted prior to coating. Blasting results in surface finish degradation as well as fatigue from stress risers. Once the parts have been coated, an oven bake out procedure is required to evaporate the solvents as well as cure the binders. These methods require the use of VOCs and are not environmentally friendly. The bond between the solid film lubricant and the part to be coated is limited by the mechanism of the binder and how well it can glue the solid film lubricant to the surface. This bonding is not very strong and the resultant coating can become thick and affect part tolerances. The binders tend to introduce impurities and increase the coefficient of friction of solid film lubricants versus their pure form.

Vacuum Methods

Solid film lubricants or other functional materials are Physical Vapor Deposited (PVD) using sputter or ion plating deposition. Parts are placed in a chamber which is evacuated of atmospheric gases by pumps. The functional material cathode is bombarded by ions to dislodge the coating on an atomic scale on to the surface of the parts to be coated. This coating tends to have strong bonding to the part due to the purity of the process but requires expensive equipment and complex process control. Limitations exist on the size and shape of the parts to be coated based on the chamber size as well as ability to effectively manipulate the part for this line of sight process.

As just described, solid film lubricants are critical for providing low friction surfaces, especially in extreme environments. There are many patents for applying solid film lubricants in special applications found across the majority of industry. Examples include automotive, internal combustion engines, aerospace, gas turbine engines, molding, glass manufacturing, welding, swaging, bearings, cabling and conveyor systems, cutting and forming tools and many others. The primary methods of solid film lubricant deposition include spraying, dipping, rubbing, tumbling or brushing. With these primary deposition methods, the solid film lubricant must be added to another medium such as epoxy, resin or wax or grease to achieve some level of adhesion to the part being coated and require a post oven bake. The addition of binders results in films which are thick and often brittle. An alternative method is to add solid film lubricants to metallic particles and then to use thermal spray methods to deposit low friction coatings. This method results in only a mechanical bond and often post coating grinding and or polishing is required. Some technologies apply solid film lubricants to the surface of parts by mechanical impingement using sand blasting equipment or tumbling polishing equipment. Such bonding, however, is very weak and surfaces must be roughened prior to coating to create divots to hold the solid film lubricant. Methods based on PVD do achieve atomistic adhesion and a thin film structure with excellent tribological characteristics. These PVD sputtering processes, however, requires expensive vacuum equipment and sophisticated process controls. Solid film lubricants deposited by PVD have the best prior art performance capabilities as well as the smallest market share.

Thus, there is a need, and a market, for an improved method to durably attach a functional layer to an object having one or more surfaces that overcomes the shortcomings of the prior art.

SUMMARY OF THE INVENTION

This invention solves the durable bonding problems of the prior art for bonding a functional layer to the surface of a substrate or three dimensional object by a convenient and low cost method.

Broadly, the present invention provides a method for durably bonding a layer to a substrate, comprising applying a substantially binder-free bond layer selected from the group consisting of a soft oxide, a soft metal, a sulfide and a chalcogenide to the substrate; and, applying a functional layer onto the bond layer.

A preferred embodiment comprises applying a bond layer of antinomy trioxide onto a metal substrate surface and then applying a lubrication layer including molybdenum disulfide.

A preferred embodiment for applying the bond layer and functional layer to an object comprises adding a substantially binder-free bond layer into a mixing vessel, adding burnishing media into the mixing vessel, rotating the mixing vessel to burnish the and coat the object with the bonding material, and then adding a functional layer onto the bonding layer.

A preferred embodiment for applying the bond layer using burnishing comprises using antimony trioxide for the bond layer and a lubrication layer including molybdenum disulfide.

BRIEF DESCRIPTION OF THE DRAWINGS

The invention will become more apparent from the following detailed specification and drawings.

DETAILED DESCRIPTION

Figure 1:
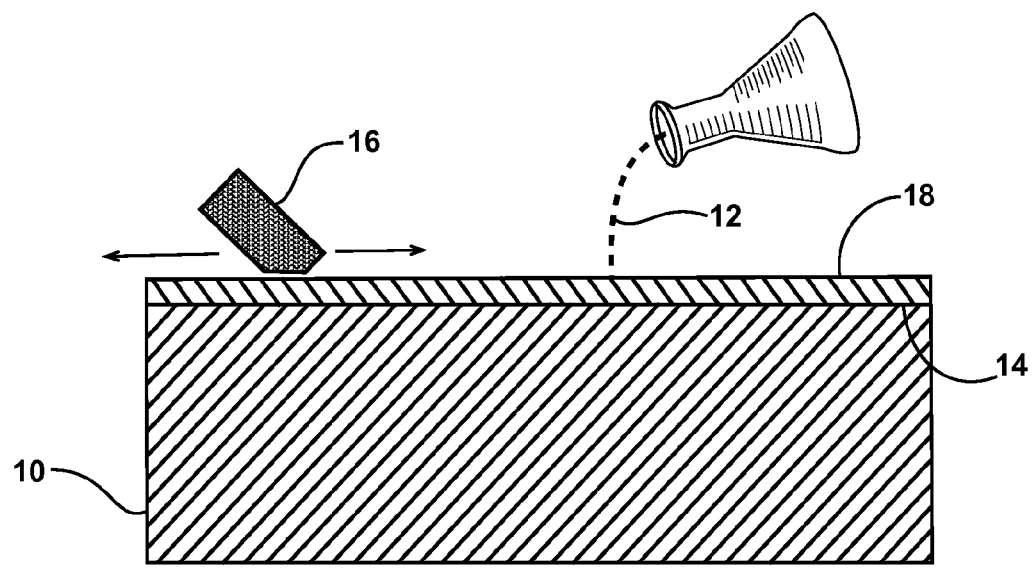
FIG. 1 is an elevation schematic view showing an example embodiment method step according to the teachings of the invention.
Figure 2:
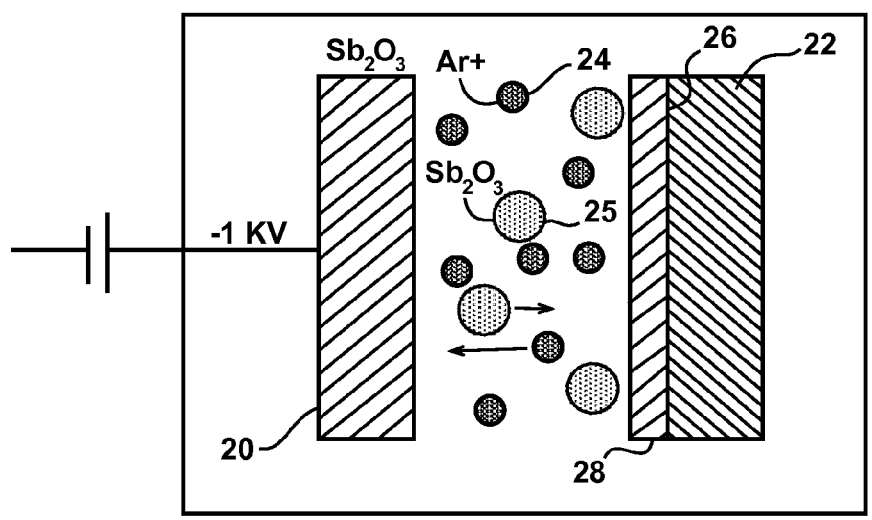
FIG. 2 is a fragmentary elevation schematic view showing an alternate example embodiment method step according to the teachings of the invention.

Referring now to the drawings, examples of applying a bond coat to the surface of a substrate are shown in FIGS. 1 and 2. On a substrate 10, a precursor bondable powder 12 is applied to surface 14 of substrate 10. Bondable powder 12 is in the form of $Sb_2O_3$ powder which, after application to surface 14, is burnished onto the surface by a burnishing tool 16 to form a bond coat 18.

Definitions

Engineering materials means shaped wood, metal, plastic, elastomer, including rubber, ceramic, coating or composites of one or more such materials.

Soft oxide means an oxide with hardness below 6 GPa.

Soft metal means a metal with hardness less than 4 GPa.

Functional layer means a material layer that provides new or additional functions to a laminate or substrate layer.

Bonding materials or functional materials, including lubricants, suitable for burnishing, means a powder, as described following, that will, at least in part, transfer during contact to a substrate surface being burnished.

Burnishing means to rub a material onto another by, for example, a ball mill where a material rubs another with a burnishing agent to be burnished between them—as in a ball colliding with a plate with powder between them—rubbing or polishing (including by hand), or by use of a buffing wheel to burnish an object or surface or by kinetic means in which the particle or powder velocity itself causes the particle to rub against and coat another material or surface.

Burnishing media means macro size components used to perform burnishing steps, such as metal balls, including ball bearings, marbles or plastic balls, of suitable size for the application, for example, having a diameter of 1/32" to 1/2" or more, and even irregular sized components, such as walnut shells, that can perform the described burnishing steps, which can be performed, for example, in a rotating drum, at a suitable speed or one that vibrates or a combination of those media.

Powder means a well divided solid having a particle size of 1 nm to 500 μm or more depending on the application. A burnishing agent can be a powder (or compacted powder) that is rubbed onto a surface to coat same, as indicated in FIGS. 1 and 3-6.

Bond layer means a material that is itself adherent to a substrate surface and enhances adhesion of subsequent layers such that a functional layer is tenaciously bonded to a substrate through the bond layer.

Burnishing aside, a functional layer can be deposited on the bond layer (of, for example, $Sb_2O_3$) by other methods, such as by magnetron sputtering, thermal spray or other suitable deposition methods, though burnishing is a preferred low cost and convenient method.

The bond layer can be deposited by methods or a combination of methods such as PVD, magnetron sputtering, CVD, thermal spray or other suitable deposition methods including electro or electroless plating, sol-gel, e-coat powder painting, conventional spray, dip or brush, although burnishing is a preferred low cost and convenient method.

The functional layer can similarly be deposited on the bonding layer by other methods or combination of methods, such as PVD, magnetron sputtering, CVD, thermal spray or other suitable deposition methods including electro or electro-less plating, sol-gel, e-coat powder painting conventional spray, dip or brush, although, again, burnishing is a preferred low-cost and convenient method.

Alternatively, within the scope of the teachings of the invention, a bond coat can be applied to a substrate by a non-burnishing method, such as sputtering, as shown in FIG. 2. That is, an electrode 20 of $Sb_2O_3$ is spaced from a substrate 22 in an atmosphere of Argon, the ions 24 of which are attracted to the $Sb_2O_3$ electrode, which frees $Sb_2O_3$ ions, which are in turn attracted to the surface 26 of substrate 22, causing $Sb_2O_3$ to coat surface 26 with a bond coat 28.

Figure 3:
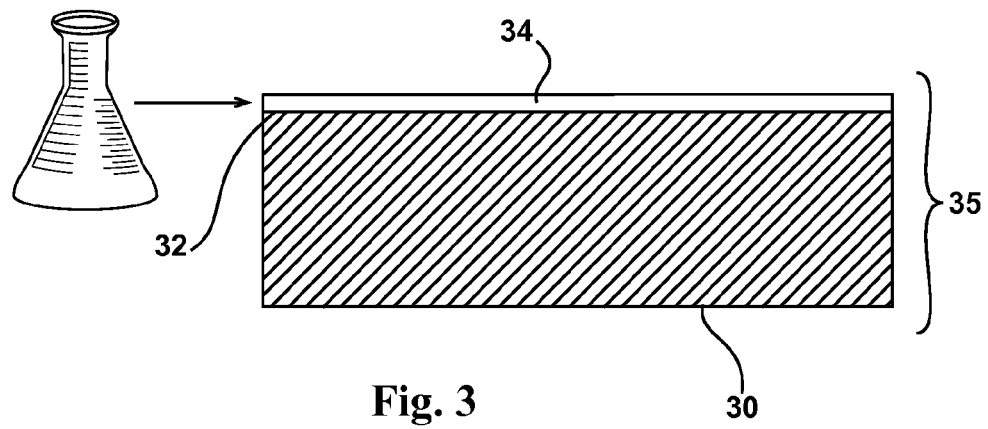
FIG. 3 is an elevation schematic view of an example embodiment first step according to the teachings of the invention.

In a further example embodiment according to the teachings of the invention, as shown in FIG. 3, substrate 30 has on its surface 32 a bond coat 34 of $Sb_2O_3$, formed by either of the methods described above with respect to FIGS. 1 and 2.

Figure 4:
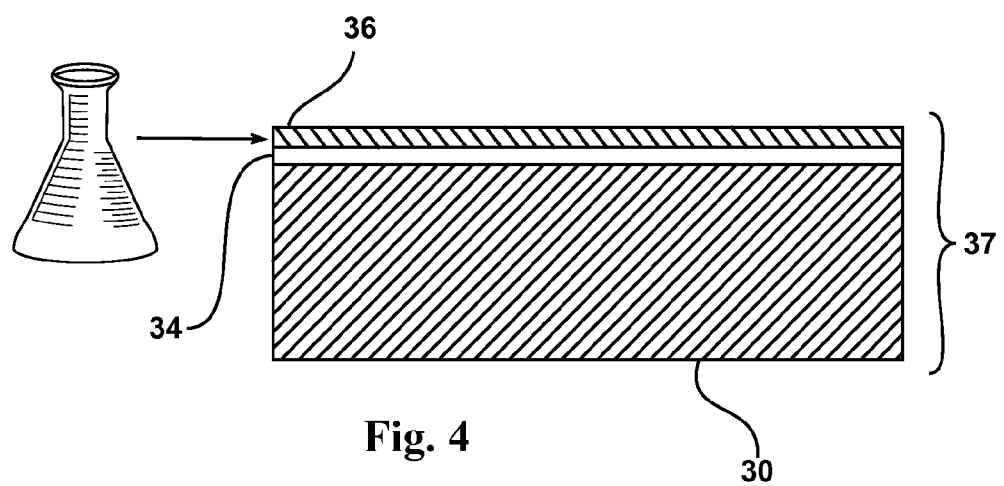
FIG. 4 is an elevation schematic view of an example embodiment second step according to the teachings of the invention.

Then, as shown in FIG. 4, a functional layer, such as a solid layer of lubricant 36, is deposited on bond coat 34, which holds lubricant layer 36 in a strong durable bond, a bond which would not be durable without bond coat 34 provided by the method of the present invention, which provides the novel products of the present invention, the durably bonded laminate 35 of FIG. 3 and the durably bonded laminate 37 of FIG. 4.

Figure 5:
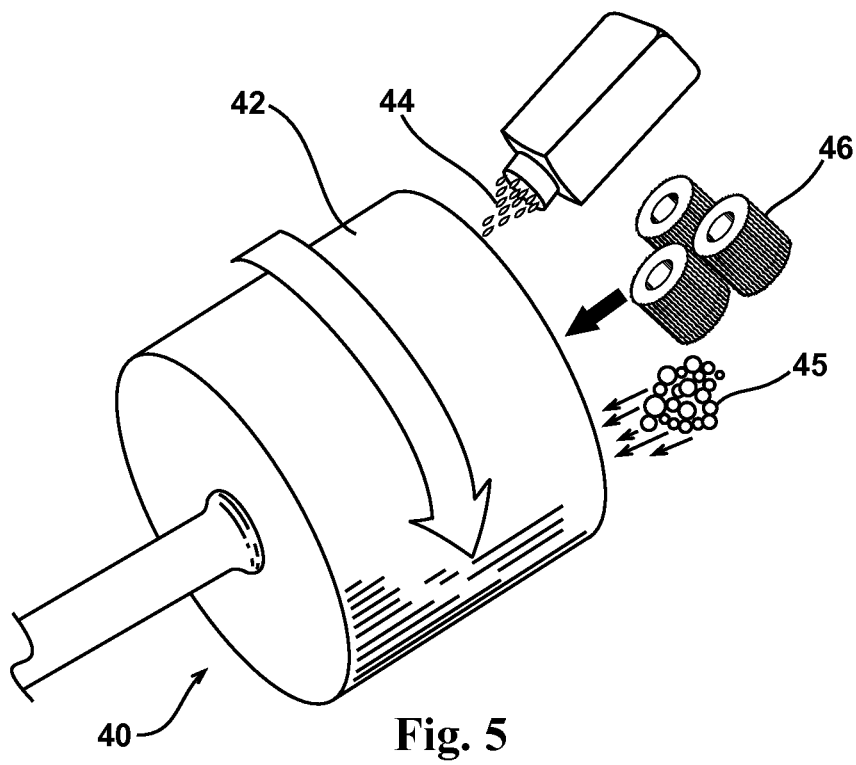
FIG. 5 is a fragmentary perspective schematic view of a first step of another example embodiment according to the teachings of the invention.
Figure 6:
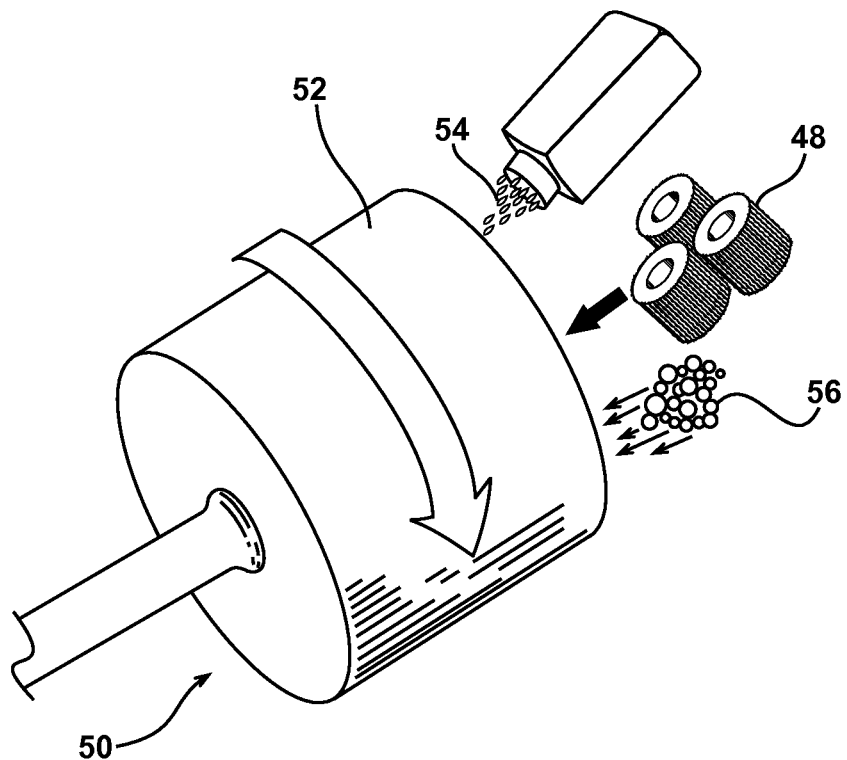
FIG. 6 is a fragmentary perspective schematic view of a second step of another example embodiment according to the teachings of the invention.

Three dimensional objects or articles can be coated in a production system by machinery, such as shown in FIGS. 5 and 6. That is, ball mill 40, having rotatable drum 42, receives $Sb_2O_3$ bonding material 44, milling beads 45 and gears 46, the objects to be coated.

The drum 40 is rotated which causes bonding material 44 to contact gears 46 and beads 45 to come into repetitive contact with bonding material and gears so as to coat, burnish and build up a coating of $Sb_2O_3$ on gears 46 in a manner similar to bond coat 34.

Thereafter, the now bond-coated gears 48 are transferred to the second coating stage, ball mill 50, having a rotatable drum 52. Here, the coated gears 48 are placed in drum 52 along with functional material, such as a lubricant 54 and beads 56. Drum 50 is rotated, as indicated in FIG. 6, and, in the manner described above regarding drum 40, lubricant material 54 is coated and burnished upon coated gears 48 to build up the lubricant as a second coating, in a manner similar to the buildup of functional layer 36 on substrate 37 in FIG. 4.

Thus, numerous three dimensional objects or articles can be coated with the above layers or coatings by ball mills, a vibratory or other machine, in a mass production system according to the teachings of the invention.

Thus, the invention provides a substrate with a bond coat as an intermediate layer (as a first laminate), which layer can receive and hold fast an added layer mounted on such bond coat (as a second laminate). The added layer can be a functional layer, such as a solid lubricant layer or other functional layer as described in this Detailed Description.

The inventive method can be a non-vacuum, ambient temperature, deposition process that does not involve binders, adhesives, curing or baking. However, applying a soft bond coat material by any method (including vacuum methods) provides benefits. A significant advantage of the bond coat is that it allows the lubricant to be deposited by burnishing and still provide low friction and long life wear protection. The chemical/physical bonding insures that the coating does not chip, crack or peel. Industrial friction and wear testing of this molecular bonding of solid film lubricants has demonstrated the superlative nature of this process.

The thickness of the bond layer or the functional layer is related to the particle size employed in the respective layers. Thus, the particle size influences the layer thickness and so the range of each can be from 1 nm to 500 μm, depending upon the application of the functional coating. That is, the bond coating and the functional coating can be smaller or less thick where the functional coating is a lubricant and of greater thickness where the functional coating is a catalyst. Within the above range, a preferred range of the respective layers, as noted earlier, is 0.5 to 3.0 μm thick, which includes about 1 μm, which will not affect part tolerances.

The basic process is as follows:
1. Surface of the substrate is properly cleaned of surface contaminants
2. The clean surface can be further activated as appropriate, acid for metals and ceramics and plasma treatment for composites and plastics
3. A thin layer of a soft oxide material such as $Sb_2O_3$ is burnished onto the surface such that a uniform film is produced
4. This can be done by many methods:
    a. Rubbing with soft clothes
    b. Vibratory tumbler with media such as ceramic, wood, corn, plastic, steel, and the like
    c. Brushing including sonic brushes
    d. Dipping
    e. Spin coating
    f. Spraying using conventional paint methods or electrostatic methods
    g. Warm Spraying or thermal spraying
    h. Plasma PVD or CVD
    i. Sol-Gel
    j. Blast impingement
    k. Buffing wheels
    l. Any loose, non-adherent material is cleaned off The solid film lubricant is then deposited on top of the soft oxide bond layer film. The solid film lubricant can be $MoS_2$ or $WS_2$ (the dichalcogenides in general), ZnO (and oxides in general), boron nitride, $CaF_2$, graphite and mixtures of these solid lubricants as well as performance enhancing additives, PTFE, or any other friction reducing material.

The solid film lubricant can be deposited by a similar method to the bond treatment.

This can be done by many methods, for example:
    a. Rubbing with soft clothes
    b. Vibratory tumbler with media such as ceramic, wood, corn, plastic, steel, and the like
    c. Brushing including sonic brushes
    d. Dipping
    e. Spin coating
    f. Spraying using conventional paint methods or electrostatic methods
    g. Warm Spraying or thermal spraying
    h. Plasma PVD or CVD
    i. Sol-Gel
    j. Blast impingement
    k. Buffing wheels
    l. Any loose, non-adherent material is cleaned off.

Thus, a significant advance in the performance of solid film lubricants has been made by the discovery of coating deposition processes for selected materials that results in higher adhesion and higher performance (lower friction and reduced wear) than PVD deposited coatings, previously considered the gold standard. It is this advancement that is the subject of this invention: a novel surface treatment method by which functional coatings such as adaptive and conventional solid film lubricants can be bonded to engineered materials with superior adhesion.

The method of the invention thus creates a bond coat for applying solid film lubricants or other functional coatings to the surface of engineered materials. The process is useful with selected materials that create good lubricant bonding and allows the lubricant to spread and be trapped in reservoirs and otherwise act synergistically with the bond coat to lower friction and wear. For example, antimony trioxide can be burnished onto an engineering material component. $MoS_2$/graphite/$Sb_2O_3$ and other lubricant mixtures, for example, can then be burnished on top of the inventive bond layer forming an adherent, long life and low friction surface. Without the surface treatment, that is, without the bond layer of the invention, the system fails quickly. Using the same lubricant and applying by PVD, the lifetime improves, but considerable cost and loss of flexibility is incurred. Deposition of the soft bond layer material can be accomplished by a variety of methods, both chemical and physical in nature. The material can be deposited by rubbing a rotating part or rotating applicator, by brushes, wheels or polishing tables. A vibratory tumbler or rocking shaker can be used as well as spraying, thermal spraying or dipping techniques. Burnishing $Sb_2O_3$ onto a surface is one preferred embodiment that is convenient, low cost and provides durable benefit.

As previously noted, solid film lubricants have shown great success in providing lubrication and wear protection in a broad range of industries as well as applications, specifically in harsh environments where conventional liquid or grease based lubricants cannot be used. The limiting factor of solid film lubricants has often been poor adhesion. Historically, to achieve adhesion parts had to be roughened by blasting or binders and solvents had to be used with oven bake procedures, all resulting in marginal adhesion of the solid film lubricant to the substrate. An alternate method has been to use vacuum plasma based technologies with high expense, process complexity and limitation on part size. The teachings of this invention provides durable adhesion of solid film lubricants and a synergistic effect is achieved, creating a low friction, low wear and a long lived lube surface. A significant advantage of the burnished $Sb_2O_3$ embodiment is that it is convenient, an environmentally friendly process, scalable and permits the lubricant to be burnished (inexpensive, environmentally friendly and scalable) onto the surface. A burnished lubricant that is as effective or more so, than PVD or CVD lubricant coatings at a significant cost savings.

As indicated, a novel surface deposition method for selected materials is provided, which enables lubricants and other functional materials to be applied to engineered surfaces with surpassing adhesion and enhanced lubricant properties. A focus of this invention has been on solving tribological problems by the use of solid film lubricants. Another industry that can benefit from this bonding process of materials in powder form is electroluminescent materials for sensors, detectors, scintillators and displays.

Thus, a low cost method is provided that, in one example embodiment, prepares a surface to tightly bond a coating, such as a lubricant layer, that lowers friction and protects such surface from wear. In addition, the bond coat process and materials act synergistically with the lubricant to provide markedly improved properties. Essentially, a bond layer is created that chemically and physically bonds lubricants to a substrate (e.g., $MoS_2$, $WS_2$ (the dichalcogenides in general), ZnO (and oxides in general), boron nitride, cesium oxythiomolybdate, $CaF_2$, graphite and mixtures of these solid lubricants), that results in improved adhesion, lubricant availability, lower friction and extended lifetime thereof. Materials adhere better and the lubrication mechanism is enhanced as the lubricant spreads and remains on the coated surfaces. The process and bond coat work on various substrates, including, metals, ceramics, plastics, composites and engineered materials in general.

Lubricants that adhered poorly to these substrates before application of the inventive process/coating adhere tenaciously afterwards. The process extends the life of coatings and lowers friction by several orders of magnitude compared to depositing coatings without the bond layer. One embodiment of the invention permits bonding by a method of burnishing a special oxide such as antimony trioxide. The bonding has superior characteristics to even plasma vacuum technologies, which is a complex and expensive process. The invention permits the lubricant coat to be applied by burnishing and yet provide the superior performance of PVD coatings. The burnishing process is significantly less expensive than vacuum based processes. The process in this invention can be described as a non-vacuum, ambient temperature, deposition process that does not involve binders, adhesives, curing or baking—no hazardous solvents or hazardous air pollutants. However, temperatures above and below the ambient can be employed in the coating steps, as desired, within the scope of the invention.

As previously noted, the invention provides a coating that does not chip, crack or peel. The final functional coating is preferably about 1 μm thick (with a range of 0.5-3.0 μm), which will not affect part tolerances. Industrial grade friction and wear testing of solid film lubricants has demonstrated the superlative nature of this process. Solid film lubricants have shown great success in providing lubrication and wear protection in a broad range of applications and would benefit many industries. Benefits are specifically notable in harsh environments where conventional liquid or grease based lubricants cannot be used. It is also noted that the process is inexpensive, environmentally friendly and noncomplex compared to other methods used to achieve improvements in solid lubricant performance. A limiting factor of solid film lubricants has been poor adhesion and limited lifetime. Historically, to achieve adhesion, parts had to be roughened by blasting or binders and solvents had to be used with oven-bake procedures, all resulting in marginal adhesion of the solid film lubricant to the substrate. An alternate method has been to use vacuum plasma based technologies with high expense, process complexity and limitation on the size of parts. The subject of this invention provides strong adhesion of solid film lubricants in a synergistic manner creating a low friction, low wear, and long life surface. The process is completely scalable to large and complex parts.

An entire industry exists for solid film lubricants. They are deposited by conventional "paint" methods (i.e., in a binder), or by complex vacuum methods. Nothing in the current art or science has the adhesion, cohesion and performance characteristics as does the subject of this invention. A number of bond coats are used, but none are burnished, which is a preferred key step, none are soft oxides or other burnishable soft compounds—in particular none are a binder-free antimony trioxide. Bond coats described outside this invention include metals and phosphate treatments, but again, not burnished oxides and soft materials.

The method of this invention applies to enhancing moving mechanical components in standard or harsh environments such as gas turbine engines, rocket engines, space based mechanisms, munitions; anywhere a low friction and low wear surface is required. Gears, splines, bearings, deployable structures (particularly in space), bushings, guides, slides, shafts, rings, pins, pistons, camshafts, hinges, seals are all components where this invention can find use.

In sum, reducing friction and wear has a tremendous payoff for any application involving moving mechanical components needs lubrication. Extending the realm of solid film lubricant applications by providing a process that joins solid lubricants to functional surfaces has windfall effects throughout all of industry. One-third of all usable, device-produced energy is lost to friction and wear and reactive maintenance costs three times that of planned maintenance, costing industry and consumers billions each year.

Finally, while durably mounted lubricant layers are an important embodiment of this invention, other functional layers are provided within the teachings of the invention, such as hard particle durable material, anti-corrosion compound, catalyst, photosensitive material, adsorbent, photovoltaic material and sensor compounds.

I claim:

1. A method for bonding a functional layer onto a surface of a substrate, the method comprising the steps of:
   (a) applying a substantially binder-free bonding material onto the surface to form a bond layer, wherein the substantially binder-free bonding material consists essentially of a soft oxide, a sulfide, or a chalcogenide; and
   (b) applying the functional layer onto the bond layer by depositing the functional layer as a lubricant powder onto the bond layer and burnishing the lubricant powder onto the bond layer.

2. The method of claim 1, wherein the substantially binder-free bonding material consists essentially of the soft oxide, wherein the soft oxide is selected from the group consisting of $Sb_2O_3$, ZnO, CdO, and PbO.

3. The method of claim 2, wherein the bond layer is $Sb_2O_3$.

4. The method of claim 1, wherein the lubricant powder is selected from the group consisting of ZnO, a dichalcogenide, boric acid, boron oxide, polytetrafluoroethlene, PbO, fullerene, carbon nanostructures, carbon fluoride, boron nitride, cesium oxythiomolybdate, $CaF_2$, graphite and mixtures thereof.

5. The method of claim 4, wherein the dichalcogenide is $MoS_2$.

6. The method of claim 4, wherein the dichalcogenide is $WS_2$.

7. The method of claim 1, wherein the surface is metal, the bond layer is $Sb_2O_3$ and the lubricant is a mixture of graphite, $Sb_2O_3$ and $MOS_2$.

8. The method of claim 1, wherein the surface is a metal, the bond layer is $Sb_2O_3$ and the lubricant is a mixture of graphite and $MOS_2$.

9. The method of claim 1, wherein the bond layer consists essentially of antimony trioxide ($Sb_2O_3$) and wherein the lubricant layer includes molybdenum disulfide ($MoS_2$).

10. The method of claim 1, wherein the substantially binder-free bonding material is in a form of a bondable powder.

11. The method of claim 1, wherein the bond layer does not include metals and phosphate treatments.

12. A method for applying a functional coating to an object, the method comprising the steps of:
   (a) adding a substantially binder-free bonding material into a mixing vessel, wherein the substantially binder-free bonding material consists essentially of a soft oxide, a sulfide, or a chalcogenide;
   (b) adding the object into the mixing vessel;
   (c) adding burnishing media into the mixing vessel;
   (d) rotating the mixing vessel to burnish and coat the object with the substantially binder-free bonding material to make a bond layer on a surface of the object; and
   (e) adding a functional layer onto the bond layer to form the functional coating.

13. The method of claim 12, wherein the object is coated with the bond layer in a first mixing vessel, and wherein the functional layer is added onto the bond layer in a second mixing vessel.

14. The method of claim 12, wherein the functional layer is selected from the group consisting of a lubricant, a hard-particle coating, an anti-corrosive material, a catalyst, a photosensitive material, an adsorbent, a photovoltaic material and a sensor containing layer.

15. The method of claim 14, wherein the lubricant is selected from the group consisting of zinc oxide, a dichalcogenide, boric acid, boron aside, polytetrafluoroethlene, PbO, fullerene carbon nanostructures, carbon fluoride, boron nitride, cesium oxythiomolybdate, $CaF_2$, graphite and mixtures thereof.

16. The method of claim 12, wherein the surface of the object is a metal.

17. The method of claim 16, wherein the soft oxide is an antimony trioxide material, and wherein the lubricant includes molybdenum disulfide.

18. The method of claim 12, wherein the substantially binder-free bonding material is a soft oxide, and wherein the functional coating is a lubricant.

* * * * *